United States Patent [19]

Ogawa et al.

[11] 4,433,094
[45] Feb. 21, 1984

[54] PNEUMATIC TIRES COMPRISING AN IMPROVED THREAD

[75] Inventors: Masaki Ogawa, Sayama; Mikihiko Ikegami, Tokorozawa, both of Japan

[73] Assignee: Bridgestone Tire Company Limited, Tokyo, Japan

[21] Appl. No.: 408,994

[22] Filed: Aug. 17, 1982

[30] Foreign Application Priority Data

Aug. 27, 1981 [JP] Japan ................................ 56-133335

[51] Int. Cl.³ .......................... C08K 3/04; C08L 9/06; B60C 11/00
[52] U.S. Cl. ................................. 524/496; 152/209 R; 152/330 R; 524/434; 524/526; 526/340
[58] Field of Search ................ 526/340; 524/434, 496, 524/526; 152/374, 209 R, 330 R

[56] References Cited

U.S. PATENT DOCUMENTS

| | | | |
|---|---|---|---|
| 3,580,895 | 5/1971 | Onishi et al. | 526/340 |
| 3,795,652 | 3/1974 | Yamaguchi et al. | 526/340 |
| 4,111,867 | 9/1978 | Komuro et al. | 526/340 |
| 4,334,567 | 6/1982 | Bond | 152/209 R |
| 4,367,325 | 1/1983 | Takeuchi et al. | 526/340 |

FOREIGN PATENT DOCUMENTS

| | | |
|---|---|---|
| 48618 | 3/1982 | European Pat. Off. . |
| 48619 | 3/1982 | European Pat. Off. . |

OTHER PUBLICATIONS

Derwent Abst. 56188e/27 (J57087407) 5-82.
Derwent Abst. 26773e/14 (EP48619) 3-82.
Derwent Abst. 26772e/14 (EP48618) 3-82.
Derwent Abst. 55307e/27 (EP54911) 6-82.

Primary Examiner—Paul Lieberman
Assistant Examiner—Herbert J. Lilling
Attorney, Agent, or Firm—Sughrue, Mion, Zinn, Macpeak and Seas

[57] ABSTRACT

A pneumatic tire comprising an improved tread is disclosed. The tread is composed of a rubber composition comprising 10-120 parts by weight of carbon black having an iodine adsorption number of not less than 36 mg/g and a dibutyl phthalate adsorption number of not less than 60 ml/100 g and 0.4-5 parts by weight of a vulcanizing agent based on 100 parts by weight of rubber content consisting of 40-100 parts by weight of styrene-butadiene copolymer rubber (hereinafter referred to as SBR-A) and 0-60 parts by weight of at least one diene rubber other than SBR-A; said SBR-A having a content of bound styrene (S) of 10-30 wt % and a content of 1,2-bond in butadiene portion (V) of 40-70 wt %, which are within a range of $65 \leq 1.7S + V \leq 100$, and satisfying that an amount of styrene sequence consisting of not less than 11 styrene monomer units is not more than 10 wt % of the content of bound styrene and an amount of styrene sequence consisting of not more than 5 styrene monomer units is not less than 80 wt % of the content of bound styrene.

15 Claims, No Drawings

PNEUMATIC TIRES COMPRISING AN IMPROVED THREAD

This invention relates to low fuel consumption tires having remarkably improved performances.

Up to now, styrene-butadiene copolymer rubbers have largely been used in a tread of the tire because of excellent skid resistance under wet condition and good wear resistance. On the other hand, however, these rubbers are unsuitable for use in large tires because they are large in the energy loss and are apt to cause heat build-up. With the spread of expressways, it is required to develop rubbers having an excellent skid resistance under wet condition in the large tires. Even in relatively small tires using the above styrene-butadiene copolymer rubber, it is significant to reduce the energy loss or rolling resistance in view of recent resource- and energy-savings. As a result, it is strongly demanded to develop novel rubbers having an excellent wet skid resistance and a low energy loss and capable of using in both large and small tires. In order to satisfy such demand, there have been developed polybutadiene rubbers or styrene-butadiene copolymer rubbers having a vinyl structure of 50-90%. These rubbers certainly give an improved wet skid resistance and a low fuel consumption, but considerably deteriorate properties such as wear resistance and strength at break. Therefore, when these rubbers are applied to a tread of a tire, salient wear rapidly occurs in use under slightly severe conditions, so that the use of such tire is quite insufficient for general purpose.

In order to further improve the properties of the above rubber, the inventors have made detailed studies with respect to the relationship between primary properties and properties after vulcanization in styrene-butadiene copolymer rubber having a content of vinyl structure in butadiene portion of 25-70% by weight, and previously proposed the development of tires using novel styrene-butadiene copolymer based on results of the above studies as a tread rubber (Japanese Patent Application No. 124,662/80 and No. 130,077/80). These tires have no problem under usual use conditions and exhibit the excellent wet skid resistance and low fuel consumption.

However, when such tires are continuously run on gravelled road or non-paved road, particularly on road surface scattering acute-angled stones, cracks are produced from sipes formed on the tire tread and finally pieces of rubber are taken off from the tread to considerably damage the appearance of the tire and also the wear resistance is considerably deteriorated. At present, an occupying ratio of paved road in Japan is relatively high, but the occupying ratio of non-paved road is not yet low, so that the above tires are actually insufficient as a low fuel consumption tire for general purpose.

It is, therefore, an object of the invention to solve the above mentioned drawbacks of the conventional tires.

According to the invention, there is the provision of in a pneumatic tire comprising a tread, the improvement wherein said tread is composed of a rubber composition comprising 10 to 120 parts by weight of carbon black having an iodine adsorption number of not less than 36 mg/g and a dibutyl phthalate adsorption number of not less than 60 ml/100 g and 0.4 to 5 parts by weight of a vulcanizing agent based on 100 parts by weight of rubber content consisting of 40 to 100 parts by weight of styrene-butadiene copolymer rubber (hereinafter referred to as SBR-A) and 0 to 60 parts by weight of at least one diene rubber other than SBR-A; said SBR-A having a content of bound styrene (S) of 10 to 30% by weight and a content of 1,2-bond in butadiene portion (V) of 40 to 70% by weight, which are within a range of $65 \leq 1.7S + V \leq 100$, and satisfying that an amount of styrene sequence consisting of not less than 11 styrene monomer units is not more than 10% by weight of the content of bound styrene and an amount of styrene sequence consisting of not more than 5 styrene monomer units is not less than 80% by weight of the content of bound styrene.

As apparent from the aforementioned earlier proposal, it is necessary to reduce molecular-weight distribution $\overline{Mw}/\overline{Mn}$ ($\overline{Mw}$ represents a weight-average molecular weight and Mn represents a number-average molecular weight) and increase the content of 1,2-bond in butadiene portion in order to simultaneously improve the skid resistance under wet condition and the low fuel consumption of SBR-A. However, when the molecular-weight distribution ($\overline{Mw}/\overline{Mn}$) is too small, the workability lowers and irregular wear occurs. When the content of 1,2-bond increases excessively in order to compensate for this drawback, the interaction with carbon black becomes small and hence the strength at break and wear resistance of the copolymer rubber are deteriorated. According to the invention, therefore, the molecular-weight distribution of SBR-A is preferably not more than 2.5 and the content of 1,2-bond in butadiene (V) is 40 to 70% by weight.

As mentioned above, it is necessary to increase the content of 1,2-bond in SBR-A, which means that the content of bound styrene (S) may be decreased in order to simultaneously improve the wet skid resistance and the rolling resistance as apparent from the following reasons. Here, the content of bound styrene is closely related to the strength at break of SBR-A. That is, when the content of bound styrene ranges up to about 35% by weight, if styrene is randomly distributed, the strength at break of SBR-A increases in proportion to the content of bound styrene, but the energy loss of SBR-A becomes inversely larger with the increase of the content of bound styrene. From this point, it is preferable that the content of bound styrene is decreased as far as possible and is 30% by weight at maximum. On the other hand, the content of bound styrene is necessary to be at least 10% by weight considering the synergistic effect with trans-1,4 bond as mentioned below. Therefore, the content of bound styrene in SBR-A is 10 to 30% by weight, preferably 15 to 25% by weight.

Furthermore, the relationship between the content of bound styrene and the content of 1,2-bond is a large factor contributing to the wet skid resistance and rolling resistance. Particularly, the content of bound styrene gives a larger contribution as compared with the content of 1,2-bond and can independently be thought because it is expressed as percent by weight on the whole of SBR-A. On the other hand, the content of 1,2-bond is expressed as percent by weight in butadiene portion, which is naturally varied with the content of bound styrene, so that it largely depends upon the content of bound styrene. For this reason, the condition for satisfying the wet skid resistance and rolling resistance is indicated by the content of bound styrene and the content of 1,2-bond as a function of the content of bound styrene. As a result of examinations, it has been confirmed that the above condition can be approximated by the following equation in copolymers having a content of bound styrene of 10 to 35% by weight, a content of 1,2-bond in butadiene portion of 25 to 80% by weight, a content of trans-1,4 bond of not less than 20% by weight and $\overline{Mw}/\overline{Mn}$ of not more than 2.5:

$$65 \leq 1.7 \times \text{content of bound styrene (\% by weight)} + \text{content of 1,2-bond (\% by weight)} \leq 100$$

That is, the wet skid resistance and rolling resistance can simultaneously be satisfied when the contents of bound styrene and 1,2-bond are within the range defined in the above equation. When the value of the equation is less than 65, the wet skid resistance lowers and even if changing the other factors such as content of trans-1,4 bond and the like, the wet skid resistance is no longer improved. While, when the value exceeds 100, even if changing the other factors, the rolling resistance cannot be improved.

Moreover, trans-1,4 bond in butadiene portion largely contributes to the wear resistance of the copolymer rubber, that is, the increase of the content of trans-1,4 bond improves the wear resistance. This phenomenon is inherent to styrene-butadiene copolymer rubbers having a relatively large content of 1,2-bond and a content of bound styrene of not less than 10% by weight. When the content of bound styrene is less than 10% by weight or in case of butadiene homopolymer containing no styrene, if the content of trans-1,4 bond increases, the wear resistance lowers inversely. Therefore, the content of trans-1,4 bond is necessary to be at least 20% by weight in SBR-A to be used in the invention. Since the above phenomenon is produced by the balance to cis-1,4 bond, it is unfavorable that the content of cis-1,4 bond becomes excessive in order to sufficiently develop the effect of improving the wear resistance by trans-1,4 bond. In SBR-A according to the invention, therefore, it is necessary that the value obtained by subtracting the content of cis-1,4 bond from the content of trans-1,4 bond is not less than 5% by weight.

According to the invention, it is necessary that the amount of styrene sequence consisting of not less than 11 styrene monomer units in SBR-A is not more than 10% by weight of the content of bound styrene. When such an amount of styrene sequence exceeds 10% by weight, not only the vibration picked up by tire from rugged road surface increases to deteriorate ride feeling, but also locally hard portion (styrene sequence) remains in the polymer to reduce the effective surface area microscopically viewed from the ground contact area and consequently skid-resistant properties, in particular wet skid resistance lower.

In general, the rubber composition for use in tread of low fuel consumption tire is required to be low in the energy loss, so that it is small in the interaction with carbon black at a relatively high temperature, e.g. 50°–100° C. As a result, even when using on good road under fairly severe conditions, such rubber composition somewhat lowers only the wear resistance but does not cause special inconvenience. However, when an input near the strength at break is applied during the running on bad road or gravelled road, cracks rapidly grow from sipe portions of the tread and finally rubber pieces are taken out to make a surface state close to chipping phenomenon. The latter case can be solved by taking a countermeasure for strengthening the interaction with carbon black, but the energy loss is undesirably increased by this countermeasure.

In this connection, the inventors have made various studies and found that when total amount of styrene sequence consisting of not more than 5 styrene monomer units is not less than 80% of the content of bound styrene in the styrene-butadiene copolymer rubber, the strength at break after vulcanization is increased to largely improve the wear resistance and as a result the resistance to deterioration of appearance on bad road can considerably be improved with the low energy loss. Furthermore, it has been found that the amount of styrene sequence consisting of single styrene monomer unit (a structure of connecting butadienes to both sides of styrene) is preferably not less than 30% by weight of the content of bound styrene. That is, by improving the styrene sequence in SBR-A as mentioned above can be improved the strength at break and wear resistance, and as a result the freedom degree of factors on the wet skid resistance and rolling resistance is increased, so that it makes possible to develop low fuel consumption tires having more improved properties.

Although SBR-A satisfying the above requirements can be used as it is, it is preferable that SBR-A is coupled with a stannic ion by using a stannic compound such as stannic chloride or the like in order to improve the workability till the manufacture of tires. The reason why SBR-A is coupled with the stannic ion is due to the fact that a part of the coupled copolymer is dissociated in the presence of fatty acid in the kneading to develop the dispersion effect of carbon black. In this case, the ratio of portions coupled with the stannic ion is preferably within a range of 30 to 75% by weight of SBR-A. When the ratio is less than 30% by weight, the coupling effect cannot be expected, while when the ratio exceeds 75% by weight, it is practically difficult to control the reaction due to liberation of tin in the coupling.

Further, the Mooney viscosity before the coupling of SBR-A (measured at 100° C.) is preferably within a range of 15 to 40. When the Mooney viscosity is less than 15, the molecular weight of SBR-A is too low and the dissociated copolymer affects the increase of energy loss, while when the Mooney viscosity exceeds 40, the value of Mooney viscosity after the coupling becomes excessively higher and the object aiming the improvement of workability is not achieved.

On the other hand, the Mooney viscosity after the coupling (measured at 100° C.) is preferably within a range of 45 to 90. When the value is less than 45, the low molecular weight copolymer after the dissociation increases the energy loss, while when the value exceeds 90, the improvement of workability cannot be obtained.

According to the invention, SBR-A may be used alone in a rubber composition for tire tread, but may be blended with not more than 60 parts by weight of at least one diene rubber other than SBR-A, which is selected from natural rubber, polybutadiene rubber, synthetic polyisoprene rubber, butadiene-acrylonitrile copolymer rubber, halogenated butyl rubber, butyl rubber, ethylene-propylene-diene terpolymer rubber (EPDM), nitrile-butadiene copolymer rubber, styrene-butadiene copolymer rubber other than SBR-A and the like, on the basis of 100 parts by weight of rubber content.

The copolymer SBR-A is fundamentally a copolymer obtained by pursuing the wet skid resistance and low fuel consumption of the tire and is molecularly designed to give a large energy loss below room temperature and reduce the energy loss above room temperature. Therefore, the rubber composition containing SBR-A is so made that the interaction between segments of SBR-A itself and interaction between SBR-A and carbon black become extremely small at a temperature above 50° C. and hence the tear strength is low at a temperature above 50° C. As a result, there is caused no problem even when the tire comprising a tread composed of such rubber composition is used on good road under severe conditions because a large tear strength is not required in such use condition. However, when the tire is used on gravelled road or non-paved road including a large number of stones with an acute-angled section scattered thereon, cracks may produce from sipe portions of the tread and grow to take out rubber pieces from the tread, whereby the appearance of the tread is considerably deteriorated and also the wear resistance is lowered remarkably. In order to prevent the drawbacks of the latter case, it has been confirmed that the rubber is rendered into a high molecular weight rubber having entanglement between rubber molecules even at a temperature above 50° C. If it is intended to increase the molecular weight of SBR-A, the interaction between SBR-A and carbon black and interaction between segments of the copolymer rubber become inversely large and consequently the resulting rubber becomes considerably hard and the workability is impractically deteriorated. In this connection, it has been confirmed that the above problem is solved without substantially damaging the wet skid resistance and low fuel consumption when blending SBR-A with a rubber having a higher weight-average molecular weight and a sufficient entanglement between molecules even at a temperature above 50° C. other than SBR-A. Furthermore, it has been found that the rubber having a higher weight-average molecular weight is styrene-butadiene copolymer rubber having a content of bound styrene (S) of 10 to 30% by weight and a content of 1,2-bond in butadiene portion (V) of less than 35% by weight (hereinafter referred to as SBR-B) or polyisoprene rubber (including natural rubber) considering the compatibility with SBR-A.

In this connection, a first preferred embodiment is a rubber blend of 40 to 90 parts by weight of SBR-A and 10 to 40 parts by weight of SBR-B, which may properly contain not more than 50 parts by weight of diene rubber other than styrene-butadiene copolymer rubber. A second preferred embodiment is a rubber blend of 40 to 90 parts by weight of SBR-A and 10 to 50 parts by weight of polyisoprene rubber and/or natural rubber. In order to increase the rebound resilience of the latter rubber blend, not more than 40 parts by weight of polybutadiene rubber may properly be added to this rubber blend, and in this case the wet skid resistance somewhat lowers.

In the first preferred embodiment, the reason why the content of bound styrene (S) in SBR-B is limited to 10–30% by weight is due to the fact that when the content S is less than 10% by weight, the strength at break of SBR-B becomes small, while when the content exceeds 30% by weight, the low fuel consumption is deteriorated.

Further, the reason why the content of 1,2-bond in butadiene portion (V) in SBR-B is limited to less than 35% by weight is due to the fact that when the content V is not less than 35% by weight, the same undesirable phenomenon as in SBR-A appears and the blending is meaningless.

And also, the reason why the blending ratio of SBR-B is limited to 10–40 parts by weight is due to the fact that when the blending ratio is less than 10 parts by weight, the blending effect is not expected, while when the blending ratio is more than 40 parts by weight, the wet skid resistance and low fuel consumption cannot be achieved simultaneously.

Moreover, it is favorable that the weight-average molecular weight of SBR-B is not less than $4.0 \times 10^5$. When the weight-average molecular weight is less than $4.0 \times 10^5$, even if SBR-B is blended with SBR-A within a range capable of satisfying the wet skid resistance and low fuel consumption at a temperature above 50° C., sufficient entanglement effect cannot be given at a temperature above 50° C. and the improvement of performances on bad road cannot be achieved.

In the second preferred embodiment, the polyisoprene rubber (including natural rubber) to be blended with SBR-A is preferable to have a content of cis-1,4 bond of not less than 90% by weight in order to prevent the deterioration of low fuel consumption. Furthermore, the weight-average molecular weight is preferable to be not less than $1.0 \times 10^6$ because when the weight-average molecular weight is less than $10 \times 10^6$, even if the polyisoprene rubber is blended with SBR-A within a range capable of satisfying the wet skid resistance and low fuel consumption at a temperature above 50° C., sufficient entanglement effect cannot be given at a temperature above 50° C. and the improvement of performances on bad road cannot be achieved. Moreover, the blending ratio of the polyisoprene rubber and/or natural rubber is within a range of 10 to 50 parts by weight. When the blending ratio is less than 10 parts by weight, the blending effect is not expected, while when the blending ratio is more than 50 parts by weight, the wet skid resistance and low fuel consumption cannot be achieved simultaneously.

In the pneumatic tire according to the invention, the rubber composition for use in tire tread is prepared by adding 10 to 120 parts by weight of carbon black and 0.4 to 5 parts by weight of a vulcanizing agent to 100 parts by weight of rubber content. When the amount of carbon black is less than 10 parts by weight, the reinforcing effect is not expected, while when the amount exceeds 120 parts by weight, the workability in the kneading or the like is deteriorated. When the amount of the vulcanizing agent is less than 0.4 part by weight, the vulcanizing effect is not expected, while when the amount exceeds 5 parts by weight, the hardness of the resulting vulcanizate is too high, which becomes impractical for use in tread.

As the carbon black, it is preferable to have an iodine adsorption number of not less than 36 mg/g and a dibutyl phthalate adsorption number of not less than 60 ml/100 g in order to further improve the wear resistance and the reinforcing property. As the vulcanizing agent, use may be made of at least one substance selected from sulfur, p-quinonedioxime, p,p'-dibenzoylquinonedioxime, 4,4'-dithiomorpholine, poly-p-dinitrosobenzene, ammonium benzoate and alkylphenol disulfide. Among them, at least one of sulfur, 4,4'-dithiomorpholine and alkylphenol disulfide is preferably used, and particularly the use of sulfur is most preferable.

According to the invention, the rubber composition for use in tread may be compounded with usual amounts of additives usually used in rubber industry in addition to the carbon black and vulcanizing agent. As the additives, there are mentioned an inorganic filler such as silica, bentonite, clay, titanium oxide, talc, china clay, diatomaceous earth, chalk and the like; a vulcanization accelerator such as N-oxydiethylene-2-benzothiazole sulfeneamide, di-2-benzothiazyl disulfide, N-cyclohexyl-2-benzothiazole sulfeneamide and the like; an accelerator activator such as zinc white, stearic acid and the like; a softener such as aromatic oil and the like; and an antioxidant such as N-phenyl-N'-isopropyl-p-phenylenediamine, phenyl-$\beta$-naphthylamine, 2-mercaptobenzimidazole and the like.

Moreover, SBR-A used in the invention is produced as follows:

In a reaction vessel of 50 l capacity are uniformly mixed 25 kg of cyclohexane, 1.3 kg of styrene, 4.5 kg of butadiene, 0.6 g of sodium dodecylbenzenesulfonate and 3.8 g of ethylene glycol diethyl ether with stirring. After the temperature of the resulting mixture is raised to 55° C., a solution of 3.77 g of n-butyl lithium in cyclohexane is added to conduct polymerization for 2 hours, during which the temperature is maintained below 60° C. To the resulting copolymer solution is added 5 g of stannic chloride, which is maintained at 45° C. for 18 hours and added with 100 g of 2,6-di-t-butyl-p-cresol. Thereafter, the resulting product is subjected to a steam stripping and dried on a hot roll of 115° C., which corresponds to SBR-A used in Example 2 as mentioned below. In this case, the content of 1,2-bond can be controlled by changing the polymerization temperature, and also the contents of trans-1,4 bond and cis-1,4 bond can be controlled primarily by the polymerization temperature and secondarily by changing the amounts of sodium dodecylbenzenesulfonate, ethylene glycol diethyl ether and n-butyl lithium to be added.

As SBR-B, there are SBR 1712 (trade name) made by Japan Synthetic Rubber Co., Ltd. (which contains 37.5 parts by weight of aromatic oil per 100 parts by weight of rubber and has a content of bound styrene of 23.5% by weight, a content of 1,2-bond in butadiene portion of 19% by weight and a weight-average molecular weight of $4.8 \times 10^5$), SBR 1714 (trade name) made by the same company (which contains 50 parts by weight of aromatic oil per 100 parts by weight of rubber and has a content of bound styrene of 23.5% by weight, a content of 1,2-bond in butadiene portion of 19% by weight and a weight-average molecular weight of $7.6 \times 10^5$) and the like.

As the polyisoprene rubber, there are natural rubber (content of cis-1,4 bond=not less than 98% by weight, weight-average molecular weight=not less than $1.15 \times 10^6$), IR 2200 (trade name) made by Japan Synthetic Rubber Co., Ltd. (content of cis-1,4 bond=98% by weight, weight-average molecular weight=$1.64 \times 10^6$) and the like.

According to the invention, the pneumatic tire may be reinforced with any cord of organic fiber such as nylon, vinylon, polyester or Kevlar (trade name) and inorganic fiber such as steel, glass or carbon. Furthermore, the carcass may take anyone of radial structure and bias structure, but the radial structure is preferable. Particularly, the rubber composition for use in tread according to the invention can develop excellent performances in radial tires wherein a tread portion arranged on a crown portion of the carcass has two laminate structure of tread base rubber and tread cap rubber. In the latter case, the rubber composition according to the invention may be used as both tread cap rubber and tread base rubber, but it is favorable that the rubber composition according to the invention is applied only to the tread cap rubber and the other rubber having a good heat build-up is used as the tread base rubber.

According to the invention, conspicuous effect can be particularly expected in radial tire for passenger cars comprising a tread of cap/base structure though the rubber composition according to the invention is advantageously applied to large radial tires for truck and bus comprising a tread of cap/base structure.

In the above cap/base structure, it is required that a ratio (Sc/S×100) of sectional area of tread cap rubber included in the equatorial section of tire Sc to total sectional area of tread portion S is within a range of 50-90%. Preferably, the ratio Sc/S is within a range of 55-75% in view of production easiness. When the ratio Sc/S is less than 50%, there is a fear of exposing the tread base rubber to the surface portion of the tread (groove portion) due to deformation produced at tire-vulcanizing and building steps. While, when the ratio Sc/S exceeds 90%, the effect of cap/base structure is not expected and the effect of the rubber composition according to the invention for the low fuel consumption and wet skid resistance cannot be developed sufficiently.

The following examples are given in illustration of the invention and are not intended as limitations thereof.

EXAMPLE 1

At first, there were provided 37 kinds of SBR-A shown in the following Table 1. Then, 37 kinds of rubber compositions were prepared by compounding 30 parts by weight of SBR 1714 (corresponding to 20 parts by weight of rubber content) as SBR-B, 50 parts by weight of carbon black ISAF (made by Toyo Continental Co., Ltd., trade name CONTINEX), 2 parts by weight of stearic acid, 1 part by weight of N-phenyl-N'-isopropyl-p-phenylenediamine (made by Seiko Kagaku Co., Ltd., trade name OZONONE), 4.0 parts by weight of zinc white, 0.6 part by weight of N-oxydiethylene-2-benzothiazole sulfeneamide, 0.8 part by weight of di-2-benzothiazyldisulfide (made by Ouchi Shinko Kagaku Kogyo Co., Ltd., trade name NOCCELER) and 1.5 parts by weight of sulfur with 80 parts of each SBR-A, respectively.

The presence of burrs in the kneading with rolls of 10 inch (25.4 cm) diameter and the strength at break (Tb) according to JIS 6301 were measured with respect to these rubber compositions.

Next, each of the above rubber compositions was used as a tread cap rubber of a tread with a cap/base structure to manufacture a tire having a size of 165 SR 13. In these tires, the ratio Sc/S was 60% and a rubber composition having the following compounding recipe was used as a tread base rubber.

| Ingredient | Part by weight |
|---|---|
| Natural rubber | 70 |
| Polybutadiene rubber (made by Japan Synthetic Rubber Co., Ltd., trade name BR01) | 30 |
| Carbon black HAF (made by Tokai Carbon Co., Ltd., trade name SEAST 3) | 32 |
| Aromatic oil (made by Nippon Sekiyu Co., Ltd., trade name KOMOREX 700) | 2 |
| Sulfur | 2.5 |
| N—oxydiethylene-2-benzothiazyl sulfenamide (NOCCELER MSA) | 1.8 |

The wet skid resistance, rolling resistance, wear resistance, irregular wear resistance and resistance to deterioration of appearance on bad road were evaluated with respect to the resulting tires to obtain results shown in Table 1.

Moreover, each evaluation and microstructure of styrene-butadiene copolymer rubber were performed by the following methods.

WET SKID RESISTANCE

A vehicle provided with the test tire was run on a wet concrete road having a water depth of 3 mm at a speed of 80 km/hr and then subjected to rapid braking at this speed, whereby a running distance required for completely stopping the vehicle was measured. Then, the wet skid resistance of the test tire was evaluated by the following equation when the tire using styrene-butadiene copolymer of Sample No. 37 in Table 1 is a control tire:

$$\frac{\left(\begin{array}{c}\text{Running distance}\\\text{of control tire}\end{array}\right) - \left(\begin{array}{c}\text{Running distance}\\\text{of test tire}\end{array}\right)}{\text{Running distance of control tire}} \times 100$$

ROLLING RESISTANCE

The test tire subjected to an internal pressure of 1.7 kg/cm$^2$ was run on a steel drum, which was rotated by the driving of a motor, at a speed of 120 km/hr under a JIS 100% load and then the driving of the motor was stopped to run the drum by inertia, during which the rolling resistance of the test tire was evaluated by the following equation likewise the evaluation of the wet skid resistance:

$$\frac{\left(\begin{array}{c}\text{Rolling resistance}\\\text{of control tire}\end{array}\right) - \left(\begin{array}{c}\text{Rolling resistance}\\\text{of test tire}\end{array}\right)}{\text{Rolling resistance of control tire}} \times 100$$

WEAR RESISTANCE

After the test tire was run over a distance of 10,000 km, the depth of the remaining tread groove was measured to evaluate the running distance required for producing wear loss of 1 mm, which was defined by an index on a basis that the control tire is 100. The larger the index value, the better the property.

MICROSTRUCTURE

The content of bound styrene was measured by means of a spectrophotometer using a calibration curve with an absorbance of 699 cm$^{-1}$. The microstructure in butadiene portion was measured according to D. Morero's method described in Chem. & Ind., 41, 758 (1959). Further, $\overline{M}w/\overline{M}n$ was measured by means of a gel permeation chromatography Model ALC/GPC-200 made by Waters Associates Inc, wherein a solution of 0.5 g of SBR-A sample in 100 ml of tetrahydrofuran was passed through a column assembly of four double columns (length=122 cm, inner diameter=7.8 mm) each filled with a gel having a pore size of $1\times10^6$, $1\times10^6$, $1\times10^5$ or $1\times10^4$ (Styragel, trade name, made by Waters Associates Inc.) at a flow amount of 0.3 ml and a flow rate of 1 ml/min. Moreover, each molecular weight was detected by a differential refractometer attached to the GPC apparatus.

IRREGULAR WEAR RESISTANCE

After the test tire was run over a distance of 20,000 km, the presence of irregular wear was observed by checking its appearance.

RESISTANCE TO DETERIORATION OF APPEARANCE ON BAD ROAD

After the test tire was run on road consisting of 40% of paved road and 60% of non-paved road over a distance of 6,000 km, the appearance was checked. This property was evaluated by five step method wherein the appearance of the control tire using the rubber composition of Sample No. 37 is 5 and the appearance of the tire using the rubber composition of Sample No. 36 is 1.

WORKABILITY

This property was evaluated by the presence of burrs on rolls of 10 inch (25.4 cm) diameter after the rubber composition was kneaded with the rolls at a roll surface temperature of 80° C.

DISTRIBUTION OF STYRENE SEQUENCE

This was evaluated according to the method developed by Tanaka et al (Kobunshi Gakkai Yokoshu, Vol. 29, No. 7, page 2055), wherein the distribution of styrene sequence in styrene-butadiene copolymer was measured by cleaving all double bond of butadiene unit with ozone and analyzing the resulting cleaved product by means of a gas permeation chromatography.

COUPLING EFFICIENCY WITH STANNIC ION

From results of GPC measured under the same conditions as described in the measurement of $\overline{M}w/\overline{M}n$ were graphed differential and integral curves of GPC (low molecular weight side is 0) after the correction of sensitivity in each molecular weight. Then, a value of the integral curve (B%) corresponding to a minimum value of the differential curve was read out on an ordinate of the graph. The coupling efficiency is indicated by a value of (100-B)%.

TABLE 1(a)

| | Sample No. | | | | |
|---|---|---|---|---|---|
| | 1 | 2 | 3 | 4 | 5 |
| Microstructure | Example | Example | Example | Example | Example |
| Content of bound styrene (% by weight) | 21.0 | 20.5 | 20.1 | 12.0 | 28.0 |
| Content of trans-1,4 bond (% by weight) | 32.0 | 30.0 | 25.0 | 26.0 | 33.0 |
| Content of cis-1,4 bond (% by weight) | 16.0 | 20.0 | 20.0 | 11.0 | 17.0 |
| Content of trans-1,4 bond - content of cis-1,4 bond (% by weight) | 16.0 | 10.0 | 5.0 | 15.0 | 16.0 |
| Content of 1,2-bond | 52.0 | 50.0 | 55.0 | 63.0 | 50.0 |

TABLE 1(a)-continued

| | Sample No. | | | | |
|---|---|---|---|---|---|
| Microstructure | 1 Example | 2 Example | 3 Example | 4 Example | 5 Example |
| (% by weight) | | | | | |
| 1.7 × content of bound styrene + content of 1,2-bond (% by weight) | 87.7 | 84.9 | 89.2 | 83.4 | 97.6 |
| Amount of styrene sequence consisting of 11 or more styrene monomer units (% by weight) | 4.5 | 4.7 | 3.2 | 5.6 | 3.4 |
| Amount of styrene sequence consisting of 5 or less styrene monomer units (% by weight) | 82 | 85 | 82 | 86 | 88 |
| Amount of styrene sequence consisting of single styrene monomer units (% by weight) | 39 | 40 | 41 | 37.5 | 41.0 |
| $M_w/M_n$ | 1.71 | 1.75 | 1.63 | 1.82 | 1.93 |
| Presence of coupling | absence | presence | presence | presence | presence |
| Mooney viscosity before coupling (100° C.) | — | 27 | 28 | 25 | 27 |
| Mooney viscosity after coupling (100° C.) | 60 | 65 | 65 | 60 | 63 |
| Coupling efficiency (%) | — | 48 | 46 | 49 | 43 |
| Resistance to deterioration of appearance on bad road | 5 | 5 | 5 | 5 | 5 |
| Workability | absence | absence | absence | absence | absence |
| Strength at break (kg/cm$^2$) | 215 | 233 | 225 | 220 | 251 |
| Wet skid resistance | 12 | 10 | 14 | 10 | 15 |
| Rolling resistance (%) | 18 | 25 | 23 | 18 | 3 |
| Wear resistance (index value) | 110 | 112 | 106 | 112 | 131 |
| Irregular wear resistance | absence | absence | absence | absence | absence |

TABLE 1(b)

| | Sample No. | | | | |
|---|---|---|---|---|---|
| Microstructure | 6 Example | 7 Example | 8 Example | 9 Example | 10 Example |
| Content of bound styrene (% by weight) | 17.0 | 15.0 | 13.0 | 20.0 | 20.0 |
| Content of trans-1,4 bond (% by weight) | 22.0 | 21.0 | 34.0 | 28.0 | 29.0 |
| Content of cis-1,4 bond (% by weight) | 13.0 | 11.0 | 20.0 | 11.0 | 18.0 |
| Content of trans-1,4 bond - content of cis-1,4 bond (% by weight) | 9.0 | 10.0 | 14.0 | 17.0 | 11.0 |
| Content of 1,2-bond (% by weight) | 65.0 | 68.0 | 46.0 | 61.0 | 53.0 |
| 1.7 × content of bound styrene + content of 1,2-bond (% by weight) | 93.9 | 93.5 | 68.0 | 95.0 | 87.0 |
| Amount of styrene sequence consisting of 11 or more styrene monomer units (% by weight) | 3.9 | 2.4 | 2.2 | 2.4 | 9.0 |
| Amount of styrene sequence consisting of 5 or less styrene monomer units (% by weight) | 83.5 | 81.6 | 83.5 | 86.2 | 90.2 |
| Amount of styrene sequence consisting of single styrene monomer units (% by weight) | 39.0 | 38.6 | 35 | 38.2 | 38 |
| $M_w/M_n$ | 1.58 | 1.55 | 1.85 | 1.68 | 1.82 |
| Presence of coupling | presence | presence | presence | presence | presence |
| Mooney viscosity before coupling (100° C.) | 26 | 24 | 24 | 26 | 25 |
| Mooney viscosity after coupling (100° C.) | 62 | 62 | 58 | 62 | 60 |
| Coupling efficiency (%) | 43.5 | 47 | 43 | 44 | 45 |
| Resistance to deterioration of appearance on bad road | 5 | 5 | 5 | 5 | 5 |
| Workability | absence | absence | absence | absence | absence |
| Strength at break (kg/cm$^2$) | 210 | 211 | 218 | 236 | 241 |
| Wet skid resistance | 13 | 16 | 10 | 22 | 14 |
| Rolling resistance (%) | 24 | 24 | 26 | 18 | 21 |
| Wear resistance (index value) | 103 | 108 | 117 | 127 | 104 |

TABLE 1(b)-continued

| | Sample No. | | | | |
|---|---|---|---|---|---|
| Microstructure | 6 Example | 7 Example | 8 Example | 9 Example | 10 Example |
| Irregular wear resistance | absence | absence | absence | absence | absence |

TABLE 1(c)

| | Sample No. | | | | |
|---|---|---|---|---|---|
| Microstructure | 11 Example | 12 Example | 13 Example | 14 Example | 15 Example |
| Content of bound styrene (% by weight) | 20.0 | 20.0 | 20.0 | 20.0 | 20.0 |
| Content of trans-1,4 bond (% by weight) | 30.0 | 31.0 | 30.0 | 29.0 | 29.0 |
| Content of cis-1,4 bond (% by weight) | 17.0 | 16.0 | 15.0 | 17.0 | 16.0 |
| Content of trans-1,4 bond - content of cis-1,4 bond (% by weight) | 13.0 | 15.0 | 15.0 | 12.0 | 13.0 |
| Content of 1,2-bond (% by weight) | 53.0 | 53.0 | 55.0 | 54.0 | 55.0 |
| 1.7 × content of bound styrene + content of 1,2-bond (% by weight) | 87.0 | 87.0 | 89.0 | 88.0 | 89.0 |
| Amount of styrene sequence consisting of 11 or more styrene monomer units (% by weight) | 3.5 | 3.3 | 4.3 | 3.2 | 2.8 |
| Amount of styrene sequence consisting of 5 or less styrene monomer units (% by weight) | 96.0 | 83.0 | 82 | 85.5 | 93.0 |
| Amount of styrene sequence consisting of single styrene monomer units (% by weight) | 42 | 25 | 33 | 35 | 42.2 |
| Mw/Mn | 1.93 | 1.73 | 1.50 | 2.4 | 1.72 |
| Presence of coupling | presence | presence | presence | presence | presence |
| Mooney viscosity before coupling (100° C.) | 26 | 26 | 26 | 25 | 16 |
| Mooney viscosity after coupling (100° C.) | 60 | 59 | 59 | 59 | 50 |
| Coupling efficiency (%) | 43 | 42 | 43 | 43 | 60 |
| Resistance to deterioration of appearance on bad road | 5 | 5 | 5 | 5 | 5 |
| Workability | absence | absence | absence | absence | absence |
| Strength at break (kg/cm$^2$) | 256 | 225 | 218 | 230 | 253 |
| Wet skid resistance | 12 | 14 | 19 | 5 | 13 |
| Rolling resistance (%) | 18 | 18 | 26 | 8 | 16 |
| Wear resistance (index value) | 129 | 120 | 118 | 115 | 105 |
| Irregular wear resistance | absence | absence | absence | absence | absence |

TABLE 1(d)

| | Sample No. | | | | |
|---|---|---|---|---|---|
| Microstructure | 16 Example | 17 Example | 18 Example | 19 Example | 20 Example |
| Content of bound styrene (% by weight) | 21.0 | 21.0 | 20.0 | 20.0 | 20.0 |
| Content of trans-1,4 bond (% by weight) | 25.0 | 28.0 | 26.0 | 28.0 | 31.0 |
| Content of cis-1,4 bond (% by weight) | 19.0 | 16.0 | 17.0 | 17.0 | 15.0 |
| Content of trans-1,4 bond - content of cis-1,4 bond (% by weight) | 6.0 | 12.0 | 9.0 | 11.0 | 16.0 |
| Content of 1,2-bond (% by weight) | 56.0 | 56.0 | 57.0 | 55.0 | 54.0 |
| 1.7 × content of bound styrene + content of 1,2-bond (% by weight) | 91.7 | 91.7 | 91.0 | 89.0 | 88.0 |
| Amount of styrene sequence consisting of 11 or more styrene monomer units (% by weight) | 3.5 | 3.3 | 4.1 | 3.2 | 3.1 |
| Amount of styrene sequence consisting of 5 or less styrene monomer units (% by weight) | 85.0 | 84.5 | 86.9 | 90.1 | 84.5 |

TABLE 1(d)-continued

| Microstructure | Sample No. 16 Example | 17 Example | 18 Example | 19 Example | 20 Example |
|---|---|---|---|---|---|
| Amount of styrene sequence consisting of single styrene monomer units (% by weight) | 35.0 | 38.6 | 36.6 | 38.5 | 36.5 |
| Mw/Mn | 1.83 | 1.99 | 1.48 | 1.68 | 1.59 |
| Presence of coupling | presence | presence | presence | presence | presence |
| Mooney viscosity before coupling (100° C.) | 38 | 20 | 35 | 24 | 21 |
| Mooney viscosity after coupling (100° C.) | 69 | 46 | 85 | 51 | 67 |
| Coupling efficiency (%) | 31 | 39 | 60 | 32 | 70 |
| Resistance to deterioration of appearance on bad road | 5 | 5 | 5 | 5 | 5 |
| Workability | absence | absence | absence | absence | absence |
| Strength at break (kg/cm$^2$) | 235 | 238 | 214 | 233 | 244 |
| Wet skid resistance | 14 | 11 | 17 | 11 | 14 |
| Rolling resistance (%) | 12 | 10 | 28 | 25 | 23 |
| Wear resistance (index value) | 113 | 102 | 124 | 112 | 118 |
| Irregular wear resistance | absence | absence | absence | absence | absence |

TABLE 1(e)

| Microstructure | Sample No. 21 Example | 22 Example | 23 Example | 24 Example | 25 Example |
|---|---|---|---|---|---|
| Content of bound styrene (% by weight) | 20.0 | 20.0 | 20.0 | 21.0 | 21.2 |
| Content of trans-1,4 bond (% by weight) | 30.0 | 32.0 | 28.0 | 28.0 | 25.0 |
| Content of cis-1,4 bond (% by weight) | 17.0 | 14.0 | 17.0 | 16.0 | 22.0 |
| Content of trans-1,4 bond - content of cis-1,4 bond (% by weight) | 13.0 | 18.0 | 11.0 | 12.0 | 3.0 |
| Content of 1,2-bond (% by weight) | 53.0 | 54.0 | 55.0 | 56.0 | 53.0 |
| 1.7 × content of bound styrene + content of 1,2-bond (% by weight) | 87.0 | 88.0 | 89.0 | 91.7 | 89.0 |
| Amount of styrene sequence consisting of 11 or more styrene monomer units (% by weight) | 2.8 | 2.5 | 3.3 | 2.6 | 2.8 |
| Amount of styrene sequence consisting of 5 or less styrene monomer units (% by weight) | 86.2 | 81.6 | 90.5 | 92.5 | 86.0 |
| Amount of styrene sequence consisting of single styrene monomer units (% by weight) | 35.4 | 42.5 | 43.8 | 53.0 | 37.0 |
| Mw/Mn | 1.88 | 1.49 | 1.63 | 1.66 | 1.82 |
| Presence of coupling | presence | absence | absence | presence | presence |
| Mooney viscosity before coupling (100° C.) | 23 | — | — | 25 | 28 |
| Mooney viscosity after coupling (100° C.) | 72 | 58 | 60 | 60 | 63 |
| Coupling efficiency (%) | 73 | — | — | 46 | 44 |
| Resistance to deterioration of appearance on bad road | 5 | 5 | 5 | 5 | 5 |
| Workability | absence | absence | absence | absence | absence |
| Strength at break (kg/cm$^2$) | 242 | 205 | 208 | 252 | 239 |
| Wet skid resistance | 10 | 15 | 12 | 16 | 10 |
| Rolling resistance (%) | 26 | 18 | 19 | 18 | 18 |
| Wear resistance (index value) | 120 | 115 | 106 | 121 | 96 |
| Irregular wear resistance | absence | absence | absence | absence | absence |

TABLE 1(f)

| Microstructure | Sample No. 26 Comparative Example | 27 Comparative Example | 28 Example | 35 Comparative Example | 30 Comparative Example |
|---|---|---|---|---|---|
| Content of bound styrene (% by weight) | 9.5 | 32.0 | 15.0 | 25.0 | 14.0 |
| Content of trans-1,4 bond (% by weight) | 21.0 | 36.0 | 18.0 | 36.0 | 7.0 |

TABLE 1(f)-continued

| Microstructure | 26 Comparative Example | 27 Comparative Example | 28 Example | 35 Comparative Example | 30 Comparative Example |
|---|---|---|---|---|---|
| Content of cis-1,4 bond (% by weight) | 13.0 | 21.0 | 13.0 | 26.0 | 7.0 |
| Content of trans-1,4 bond - content of cis-1,4 bond (% by weight) | 8.0 | 17.0 | 5.0 | 10.0 | 13.0 |
| Content of 1,2-bond (% by weight) | 66.0 | 43.0 | 69.0 | 38.0 | 85.0 |
| 1.7 × content of bound styrene + content of 1,2-bond (% by weight) | 82.2 | 97.4 | 94.5 | 80.5 | 98.8 |
| Amount of styrene sequence consisting of 11 or more styrene monomer units (% by weight) | 9.6 | 2.8 | 3.1 | 2.5 | 3.1 |
| Amount of styrene sequence consisting of 5 or less styrene monomer units (% by weight) | 88 | 86 | 86.5 | 85.6 | 86.9 |
| Amount of styrene sequence consisting of single styrene monomer unit (% by weight) | 31.0 | 40.0 | 38.0 | 39.5 | 86.9 |
| Mw/Mn | 1.63 | 1.96 | 1.72 | 1.45 | 1.77 |
| Presence of coupling | presence | presence | presence | presence | presence |
| Mooney viscosity before coupling (100° C.) | 30 | 28 | 25 | 22 | 25 |
| Mooney viscosity after coupling (100° C.) | 67 | 69 | 60 | 60 | 61 |
| Coupling efficiency (%) | 45 | 53 | 45 | 52 | 43 |
| Resistance to deterioration of appearance on bad road | 5 | 5 | 5 | 5 | 5 |
| Workability | absence | absence | absence | presence | absence |
| Strength at break (kg/cm$^2$) | 199 | 241 | 193 | 240 | 191 |
| Wet skid resistance | −2 | 20 | 11 | −2 | 20 |
| Rolling resistance (%) | 22 | −10 | 24 | 16 | −1 |
| Wear resistance (index value) | 95 | 125 | 90 | 115 | 98 |
| Irregular wear resistance | absence | absence | absence | presence | absence |

TABLE 1(g)

| Microstructure | 31 Comparative Example | 32 Comparative Example | 33 Comparative Example | 34 Comparative Example | 35 Comparative Example |
|---|---|---|---|---|---|
| Content of bound styrene (% by weight) | 13.0 | 23.0 | 21.0 | 20.0 | 18.0 |
| Content of trans-1,4 bond (% by weight) | 36.0 | 26.0 | 28.0 | 29.0 | 27.0 |
| Content of cis-1,4 bond (% by weight) | 23.0 | 11.0 | 17.0 | 15.0 | 19.0 |
| Content of trans-1,4 bond - content of cis-1,4 bond (% by weight) | 13.0 | 15.0 | 11.0 | 14.0 | 8.0 |
| Content of 1,2-bond (% by weight) | 41.0 | 63.0 | 55.0 | 56.0 | 54.0 |
| 1.7 × content of bound styrene + content of 1,2-bond (% by weight) | 63.1 | 102.1 | 90.7 | 90.0 | 88.0 |
| Amount of styrene sequence consisting of 11 or more styrene monomer units (% by weight) | 25 | 26 | 11.0 | 13.0 | 3.2 |
| Amount of styrene sequence consisting of 5 or less styrene monomer units (% by weight) | 89.9 | 89.4 | 78.0 | 76.0 | 75 |
| Amount of styrene sequence consisting of single styrene monomer unit (% by weight) | 38.6 | 36.2 | 35.0 | 35.0 | 31 |
| Mw/Mn | 1.73 | 2.01 | 2.14 | 1.69 | 1.83 |
| Presence of coupling | presence | presence | presence | presence | presence |
| Mooney viscosity before coupling (100° C.) | 22 | 25 | 26 | 25 | 27 |
| Mooney viscosity after coupling (100° C.) | 56 | 60 | 59 | 66 | 60 |
| Coupling efficiency (%) | 47 | 45 | 46 | 56 | 45.5 |
| Resistance to deterioration | 5 | 5 | 3 | 2 | 2 |

TABLE 1(g)-continued

| Microstructure | Sample No. | | | | |
|---|---|---|---|---|---|
| | 31 Comparative Example | 32 Comparative Example | 33 Comparative Example | 34 Comparative Example | 35 Comparative Example |
| of appearance on bad road | | | | | |
| Workability | absence | absence | absence | absence | absence |
| Strength at break (kg/cm$^2$) | 225 | 238 | 198 | 189 | 200 |
| Wet skid resistance | −3 | 24 | −6 | −8 | −2 |
| Rolling resistance (%) | 7 | −6 | 10 | 5 | 13 |
| Wear resistance (index value) | 114 | 121 | 88 | 91 | 92 |
| Irregular wear resistance | absence | absence | absence | absence | absence |

TABLE 1(h)

| Microstructure | Sample No. | |
|---|---|---|
| | 36 Comparative Example | 37 Control |
| Content of bound styrene (% by weight) | 18.0 | 23.5 |
| Content of trans-1,4 bond (% by weight) | 22.0 | 66.0 |
| Content of cis-1,4 bond (% by weight) | 20.0 | 15.0 |
| Content of trans-1,4 bond - content of cis-1,4 bond (% by weight) | 2.0 | 51.0 |
| Content of 1,2-bond (% by weight) | 58.0 | 19.0 |
| 1.7 × content of bound styrene + content of 1,2-bond (% by weight) | 88.6 | 34.8 |
| Amount of styrene sequence consisting of 11 or more styrene monomer units (% by weight) | 1.9 | 2.0 |
| Amount of styrene sequence consisting of 5 or less styrene monomer units (% by weight) | 68.0 | 93.5 |
| Amount of styrene sequence consisting of single styrene monomer unit (% by weight) | 21.0 | 52.5 |
| Mw/Mn | 1.68 | 3.5 |
| Presence of coupling | absence | absence |
| Mooney viscosity before coupling (100° C.) | — | — |
| Mooney viscosity after coupling (100° C.) | 60 | 52 |
| Coupling efficiency (%) | — | — |
| Resistance to deterioration of appearance on bad road | 1 | 5 |
| Workability | absence | absence |
| Strength at break (kg/cm$^2$) | 178 | 230 |
| Wet skid resistance | 11 | 0 |
| Rolling resistance (%) | −2 | 0 |
| Wear resistance (index value) | 68 | 100 |
| Irregular wear resistance | absence | absence |

As apparent from the data of Table 1, the tires using SBR-A according to the invention are considerably excellent in the properties.

EXAMPLE 2

Nine rubber compositions shown in the following Tables 2 and 3 were prepared and the workability and strength at break thereof were evaluated in the same manner as described in Example 1. Then, each of these rubber composition was used as a tread cap rubber of a tread with a cap/base structure together with the same tread base rubber as described in Example 1, provided that the ratio Sc/S is 70%, to manufacture a tire. The wet skid resistance, rolling resistance, wear resistance, irregular wear resistance and resistance to deterioration of appearance on bad road were evaluated with respect to the resulting tire to obtain results shown in Tables 2 and 3.

As apparent from the data of Tables 2 and 3, the pneumatic tires according to the invention are considerably excellent in the properties as compared with the tires of Comparative Examples.

TABLE 2

| | Sample No. | | | | |
|---|---|---|---|---|---|
| | 38 Comparative Example | 39 Example | 40 Example | 41 Example | 42 Example |
| SBR-B (SBR 1712*) | 65 | 40 | 20 | 10 | — |
| Polybutadiene rubber BR01 | — | — | — | 15 | — |
| Natural rubber | — | — | — | — | — |
| SBR-A (Sample No. 18) | 35 | 60 | 80 | 75 | 100 |
| Carbon black HAF | 47 | 47 | 47 | 47 | 47 |
| Aromatic oil | 8 | 8 | 8 | 8 | 8 |
| N—phenyl-N'—isopropyl-p-phenylenediamine | 1 | 1 | 1 | 1 | 1 |
| Stearic acid | 2 | 2 | 2 | 2 | 2 |
| Zinc white | 4 | 4 | 4 | 4 | 4 |
| N—oxydiethylene-2-benzothiazolesulfeneamide | 1.0 | 1.0 | 1.0 | 1.0 | 1.0 |
| di-2-benzothiazylsulfide | 0.2 | 0.2 | 0.2 | 0.2 | 0.2 |
| p-amylphenol disulfide | 2.0 | 2.0 | 2.0 | 2.0 | 2.0 |
| Resistance to deterioration of appearance on bad road | 5 | 5 | 5 | 5 | 3 |
| Workability | absence | absence | absence | absence | absence |
| Strength at break | 243 | 244 | 228 | 235 | 211 |
| Wet skid resistance | −3 | +11 | +15 | +12 | +15 |
| Rolling resistance | 0 | +20 | +25 | +27 | +12 |

TABLE 2-continued

| | Sample No. | | | | |
|---|---|---|---|---|---|
| | 38 Comparative Example | 39 Example | 40 Example | 41 Example | 42 Example |
| Wear resistance | 98 | 105 | 120 | 122 | 121 |
| Irregular wear resistance | absence | absence | absence | absence | absence |

*SBR 1712 contains 37.5 phr of aromatic oil per 100 phr of rubber.
In Table 2, each compounding amount is expressed by a numerical value in terms of rubber content and the amount of aromatic oil is a gross amount in the composition.

TABLE 3

| | Sample No. | | | |
|---|---|---|---|---|
| | 43 Comparative Example | 44 Example | 45 Example | 46 Example |
| Polybutadiene BR01 | — | — | — | 10 |
| Natural rubber | 65 | 40 | 15 | 30 |
| SBR-A (Sample No. 18) | 35 | 60 | 85 | 60 |
| Carbon black HAF | 50 | 50 | 50 | 50 |
| Aromatic oil | 10 | 10 | 10 | 10 |
| N—phenyl-N′—isopropyl-p-phenylenediamine | 1 | 1 | 1 | 1 |
| Stearic acid | 2 | 2 | 2 | 2 |
| Zinc white | 4 | 4 | 4 | 4 |
| N—oxydiethylene-2-benzothiazole-sulfeneamide | 0.7 | 0.7 | 0.7 | 0.7 |
| di-2-benzothiazyl-sulfide | 0.2 | 0.2 | 0.2 | 0.2 |
| p-amylphenol disulfide | 2.0 | 2.0 | 2.0 | 2.0 |
| Resistance to deterioration of appearance on bad road | 5 | 5 | 5 | 5 |
| Workability | absence | absence | absence | absence |
| Strength at break | 255 | 245 | 242 | 241 |
| Wet skid resistance | −4 | +12 | +22 | +11 |
| Rolling resistance | +9 | +27 | +21 | +25 |
| Wear resistance | 98 | 100 | 109 | 104 |
| Irregular wear resistance | absence | absence | absence | absence |

EXAMPLE 3

Five SBR series rubber compositions were prepared by using SBR-A of Sample No. 18 of Table 1 and five kinds of SBR-B shown in the following Table 4 at the following compounding recipe, respectively. Similarly, five polyisoprene series rubber compositions were prepared by using SBR-A of Sample No. 18 of Table 1 and natural rubber or four kinds of polyisoprene rubber shown in Table 4 at the following compounding recipe, respectively.

| SBR series rubber composition | | Polyisoprene series rubber composition | |
|---|---|---|---|
| Ingredient | Part by weight | Ingredient | Part by weight |
| Sample No. 18 | 80 | Sample No. 18 | 70 |
| SBR-B*[1] | 20 | Polyisoprene rubber | 30 |
| N-339*[2] | 48 | N-339 | 50 |
| Aromatic oil*[3] | 10 | Aromatic oil | 10 |
| 810 NA*[4] | 1 | 810 NA | 1 |
| ZnO | 4 | ZnO | 4 |
| DM | 0.2 | DM | 0.2 |
| Nobs*[5] | 0.7 | Nobs | 0.6 |
| Sulfur | 1.5 | Sulfur | 1.75 |

Note
*[1]In case of oil extended SBR, the rubber content was 20 parts by weight.
*[2]carbon black.
*[3]In case of oil extended SBR, the amount of aromatic oil was based on the total amount of the rubber composition.
*[4]trade name of N—phenyl-N′—isopropyl-p-phenylenediamine, made by Ouchi Shinko Kagaku Co., Ltd.
*[5]trade name of N—oxyethylene-2-benzothiazylsulfeneamide, made by Ouchi Shinko Kagaku Co., Ltd.

Each of the SBR series rubber compositions (Sample Nos. 47–51) and polyisoprene series rubber compositions (Sample Nos. 52–57) was used to manufacture a tire in the same manner as described in Example 1. The strength at break of the rubber composition and the properties of the tire were evaluated to obtain results shown in Table 4.

TABLE 4(a)

| | Sample No. | | | | |
|---|---|---|---|---|---|
| Microstructure | 47 Example | 48 Example | 49 Example | 50 Example | 51 Example |
| SBR-B or polyisoprene (IR) | SBR | SBR | SBR | SBR | SBR |
| Content of bound styrene (% by weight) | 23.5 | 23.5 | 23.5 | 18 | 25 |
| Content of 1,2-bond or 3,4-bond | 19 | 19 | 19 | 12 | 32 |
| Content of cis-1,4 bond | 14 | 15 | 15 | 38 | 27 |
| Weight-average molecular weight ($\times 10^5$) | 7.6 | 4.8 | 3.5 | 2.6 | 5.0 |
| Trade name | SBR 1714 | SBR 1712 | SBR 1500 | SBR 1000 | |
| Maker | JSR* | JSR | JSR | Asahi Kasei Kogyo K.K. | |
| Resistance to deterioration of appearance on bad road | 5 | 5 | 4 | 3 | 5 |
| Workability | absence | absence | absence | absence | absence |
| Strength at break (kg/cm$^2$) | 218 | 215 | 210 | 221 | 223 |
| Wet skid resistance | 18 | 18 | 16 | 7 | 20 |
| Rolling resistance (%) | 29 | 27 | 28 | 30 | 21 |
| Wear resistance (index value) | 119 | 118 | 110 | 105 | 109 |
| Irregular wear resistance | absence | absence | absence | absence | absence |

*JSR is Japan Synthetic Rubber Co., Ltd.

TABLE 4(b)

| Microstructure | Sample No. | | | | |
|---|---|---|---|---|---|
| | 52 Example | 53 Example | 54 Example | 56 Example | 57 Example |
| SBR-B or polyisoprene (IR) | Natural rubber | IR | IR | IR | IR |
| Content of bound styrene (% by weight) | — | — | — | — | — |
| Content of 1,2-bond or 3,4-bond | 1 | 2.0 | 1.5 | 5.0 | 8 |
| Content of cis-1,4 bond | 99 | 98.0 | 98.5 | 84.8 | 92 |
| Weight-average molecular weight ($\times 10^5$) | 11.5 | 16.4 | 16.5 | 25.6 | 0.5 |
| Trade name | | IR 2200 | IR 10 | KARIFLEX 305 | LIR 50 |
| Maker | | JSR | Kuraray Co., Ltd. | | Kuraray Co., Ltd. |
| Resistance to deterioration of appearance on bad road | 5 | 5 | 5 | 4 | 3 |
| Workability | absence | absence | absence | absence | absence |
| Strength at break (kg/cm$^2$) | 235 | 228 | 233 | 212 | 201 |
| Wet skid resistance | 12 | 13 | 15 | 22 | 25 |
| Rolling resistance (%) | 27 | 27 | 26 | −1 | 6 |
| Wear resistance (index value) | 105 | 101 | 101 | 103 | 99 |
| Irregular wear resistance | absence | absence | absence | absence | absence |

What is claimed is:

1. In a pneumatic tire comprising a tread, the improvement wherein said tread is composed of a rubber composition comprising 10 to 120 parts by weight of carbon black having an iodine adsorption number of not less than 36 mg/g and a dibutyl phthalate adsorption number of not less than 60 ml/100 g and 0.4 to 5 parts by weight of a vulcanizing agent based on 100 parts by weight of rubber content consisting of 40 to 100 parts by weight of styrene-butadiene copolymer rubber (hereinafter referred to as SBR-A) and 0 to 60 parts by weight of at least one diene rubber other than SBR-A; said SBR-A having a content of bound styrene (S) of 10 to 30% by weight and a content of 1,2-bond in butadiene portion (V) of 40 to 70% by weight, which are within a range of $65 \leq 1.7S + V \leq 100$, and satisfying that an amount of styrene sequence consisting of not less than 11 styrene monomer units is not more than 10% by weight of the content of bound styrene and an amount of styrene sequence consisting of not more than 5 styrene monomer units is not less than 80% by weight of the content of bound styrene.

2. A pneumatic tire according to claim 1, wherein said diene rubber is selected from natural rubber, polybutadiene rubber, synthetic polyisoprene rubber, butadieneacrylonitrile copolymer rubber, butyl rubber, halogenated butyl rubber, ethylene-propylene-diene terpolymer rubber, nitrile-butadiene copolymer rubber and styrene-butadiene copolymer rubber other than said SBR-A.

3. A pneumatic tire according to claim 1, wherein said rubber content consists of 40 to 90 parts by weight of SBR-A, 10 to 40 parts by weight of styrene-butadiene copolymer rubber having a content of bound styrene of 10 to 30% by weight and a content of 1,2-bond in butadiene portion of less than 35% by weight (hereinafter referred to as SBR-B) and 0 to 50 parts by weight of diene rubber other than said styrene-butadiene copolymer rubber.

4. A pneumatic tire according to claim 1, wherein said rubber content consists of 40 to 90 parts by weight of SBR-A, 10 to 50 parts by weight of polyisoprene rubber and/or natural rubber and 0 to 40 parts by weight of polybutadiene.

5. A pneumatic tire according to claim 1, wherein in said SBR-A an amount of styrene sequence consisting of single styrene monomer unit (structure of connecting butadienes to both sides of styrene) is not less than 30% by weight of the content of bound styrene.

6. A pneumatic tire according to claim 1, wherein said SBR-A a content of trans-1,4 bond in butadiene portion is not less than 20% by weight.

7. A pneumatic tire according to claim 1, wherein in said SBR-A a value obtained by subtracting said content of cis-1,4 bond in butadiene portion from said content of trans-1,4 bond in butadiene portion is not less than 5% by weight.

8. A pneumatic tire according to claim 1, wherein said SBR-A has a ratio of weight-average molecular weight to number-average molecular weight of not more than 2.5.

9. A pneumatic tire according to claim 1, wherein said SBR-A is coupled with a stannic ion.

10. A pneumatic tire according to claim 1, wherein said vulcanizing agent is at least one substance selected from sulfur, p-quinonedioxime, p,p'-dibenzoylquinonedioxime, 4,4'-dithiodimorpholine, poly-p-dinitrosobenzene, ammonium benzoate and alkylphenol disulfide.

11. A pneumatic tire according to claim 3, wherein said SBR-B has a weight-average molecular weight of not less than $4.0 \times 10^5$.

12. A pneumatic tire according to claim 4, wherein said polyisoprene rubber has a content of cis-1,4 bond of not less then 90% by weight and a weight-average molecular weight of not less than $1.0 \times 10^6$.

13. A pneumatic tire according to claim 9, wherein stannic chloride is used as said stannic ion.

14. A pneumatic tire according to claim 9, wherein said SBR-A after the coupling has a Mooney viscosity (at 100° C.) of 45 to 90.

15. A pneumatic tire according to claim 9, wherein a ratio of stannic ion coupled portion in said SBR-A is 30 to 75% by weight.

* * * * *